Nov. 10, 1970  D. STANIMIROVITCH ET AL  3,539,337
PRODUCTION OF IRON OXIDE AND IRON FREE OF MANGANESE
Filed Dec. 12, 1967
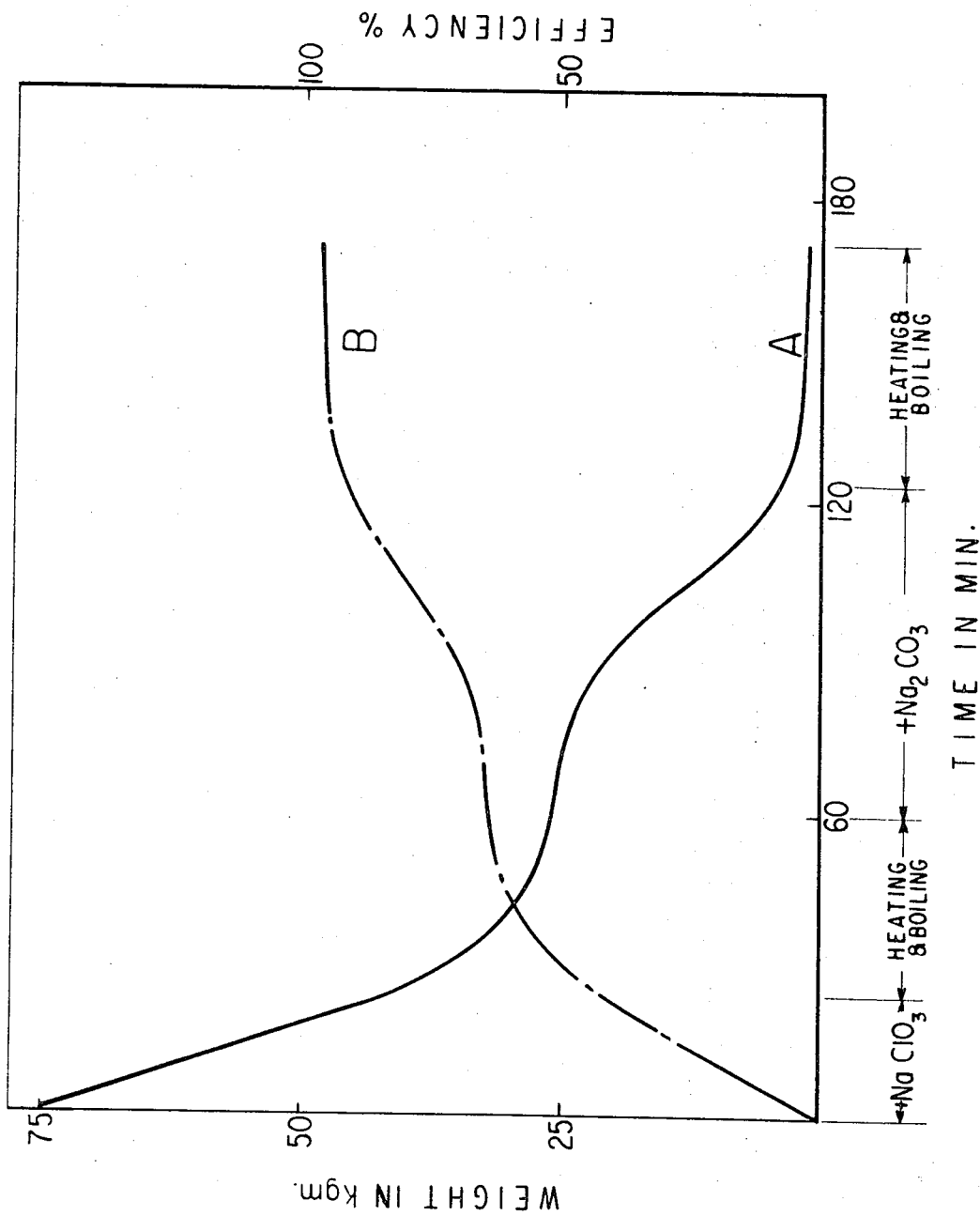
INVENTORS
DOUCHAN STANIMIROVITCH
ANDRÉ LEON KAHN
BY
Kenyon & Kenyon
ATTORNEYS 3,539,337
PRODUCTION OF IRON OXIDE AND IRON
FREE OF MANGANESE
Douchan Stanimirovitch and André Leon Kahn, Paris,
France, assignors to Societe des Accumulateurs Fixes et
de Traction (Societe Anonyme), Romainville, Seine-
Saint-Denis, France, a company of France
Filed Dec. 12, 1967, Ser. No. 689,847
Claims priority, application France, Dec. 21, 1966,
88,327
Int. Cl. C01g 49/06, 49/08; C21b 15/00
U.S. Cl. 75—108                                      7 Claims

ABSTRACT OF THE DISCLOSURE

Highly pure and highly porous ferric oxide produced by oxidation of a ferrous sulfate solution by an energetic oxidizing agent in particular an alkali chlorate to produce alkali ferric oxysulfate characterized by the fact that said oxidation is carried to completion of the precipitation of the oxysulfate by the addition of alkali ions (the alkali ions constituting sodium ions and the proportion of 3 to 4 alkali cations for 6 cations of iron being used), this precipitation taking place during boiling, the ferric oxysulfate product thus obtained then being subjected to heating at high temperature in an oxidizing atmosphere to obtain ferric oxide, said ferric oxide which is very pure and highly porous being further reducible to magnetite or iron respectively by partial or complete reduction in a reducing atmosphere such as hydrogen.

BRIEF SUMMARY OF INVENTION

This invention relates to a method for producing alkali ferric oxysulfate, more particularly aimed at obtaining a highly pure and very porous ferric oxide. This invention relates thus also to a method for producing such a ferric oxide from the said alkali ferric oxysulfate.

In addition, this invention relates to the new industrial products constituted by the said alkali oxysulfates such as a sodium ferric oxysulfate, a potassium ferric oxysulfate and/or to the ferric oxide obtained from them, as well as to the magnetic or metal iron, respectively obtained through partial or complete reduction of the thus produced ferric oxide.

Ferric oxides generally prepared from ferrous salts contain several foreign materials especially manganese which gives different kinds of manganese oxides during the course of oxidizing and precipitating operations. The presence of such oxides is harmful in some uses of ferric oxide such as battery manufacturing. It is also harmful in pigment manufacturing since manganese oxides affect their aspect and vividness. On the other hand, sufficiently pure products (ferric oxide, magnetite or iron) are always very advantageous in other industries as raw materials.

Methods for producing ferric oxide practically free from manganese have already been proposed. For this purpose, a ferrous sulfate solution which may contain a great quantity of manganous sulfate is oxidized in acid medium in order to obtain a precipitate of ferric hydroxide, so that the precipitation of manganese oxide is prevented since the manganese salts remain in the solution. After filtering, washing and drying the precipitate, substantially pure ferric oxide is obtained.

In such conditions, the recommended oxidizing agent is for instance sodium chlorate, and the reaction may be written as follows:

(1) $6\ FeSO_4 + NaClO_3 + 3H_2O = 2Fe(OH)_3 + 2\ Fe_2(SO_4)_3 + NaCl$

Thus one mole of sodium chlorate is used to oxidize six iron atoms to the ferric state, so that two moles of pure ferric hydroxide are obtained while two ferric sulfate moles remain in solution.

It has also been suggested to carry out the reaction (1) by moderately heating the ferrous sulfate and sodium chlorate solution (at a temperature slightly above 60° C.). Although this known process has a great theoretical interest, it is not interesting to put it in industrial application for the following reasons:

One chlorine atom must be used for six iron atoms whereas the useful product, i.e., ferric hydroxide, contains only two iron atoms; the theoretical efficiency of this reaction is thus approximately 33% since the ferric hydroxide contains only one third of the total amount of the oxidized iron whereas two thirds of the oxidized iron remain in solution as ferric sulfate. This low efficiency is expensive and objectionable.

The ferric sulfate solution is very corrosive and its removal raises problems very difficult to overcome because of the very fast attack of metal pipes by the said solution.

The ferric hydroxide precipitate is obtained in an amorphous condition which is difficult to wash.

After drying, this ferric hydroxide precipitate has a very low internal porosity, since this is only due to the loss of moisture of an amorphous product; the porosity of such a product is a porosity of structural nature resulting from the packing of particles in an arrangement characteristic of the powder. Such a porosity is quite different from internal porosity which is practically independent of the size and shape of the powder particles as it results essentially from cavities formed in a crystallized substance. As the internal porosity is here very low the total specific surface area of the powder remains very small and consequently the number of active and catalytic sites is smaller than in a powder of high internal porosity. Therefore, the product obtained by this method has reduced activity and catalytic characteristics.

Objects and features of the invention are to provide an improved highly efficient method for producing highly pure and highly porous ferric oxide which has none of the disadvantages hereinabove set forth.

The improved method for producing ferric oxide according to the invention has none of the drawbacks mentioned hereabove; it provides high efficiency values, eliminates the drawbacks due to corrosion by great residual quantities of ferric sulfate and yields a final product having a very good internal porosity, thus a high catalytic power and activity. This method is essentially based on the formation of an intermediary compound of a new type, viz, an alkali ferric oxysulfate.

The method for producing an alkali ferric oxysulfate according to this invention is remarkable notably in that it consists in heating up to the boiling point the products resulting from the action of an oxidizing agent on a ferrous sulfate solution during or after their formation in presence of alkali cations the medium remaining acid as a whole.

According to a feature of the invention, the said alkali cations can be supplied exclusively by the oxidizing agent; in this case the oxidizing agent is for instance an alkali chlorate, such as potassium chlorate, or preferably sodium chlorate, so that the said alkali iron sulfate should be formed.

According to another feature of the invention, the said alkali cations are partially or totally supplied by addition of alkali hydroxide and/or carbonate.

The oxidizing agent which is used can be of any known type, that is to say that it can be chosen not only from among alkali chlorates but also from among the following agents: air, ozone, hydrogen peroxide;

either air or ozone can be injected or hydrogen peroxide poured. In all these cases, an alkali solution containing preferably sodium ions must also be added.

According to another feature of the invention, the said heating or boiling can be effected either during the oxidation of the ferrous sulfate or immediately after, the alkali cations which may be added independently of the oxidizing agent being introduced either with or after the said oxidizing agent.

This alkali ferric oxysulfate product after washing and drying is subjected to heating at high temperature in an oxidizing atmosphere to obtain a very pure and porous ferric oxide.

The highly pure and highly porous ferric oxide resulting from the method of this invention can subsequently be subjected to partial or complete reduction to produce respectively either magnetite or iron.

Other objects and features of the invention will become apparent from the following detailed description and accompanying drawing forming part hereof wherein the single figure is illustrative of characteristics with respect to iron content of a ferrous sulfate solution treated according to this invention and also of the total efficiency in iron resulting therefrom.

The invention will be better understood by the description of the following fundamental experiment: when the products of reaction (1) noted above are submitted to boiling, either as soon as they are formed or even during their formation, the color of the solution turns progressively from red to yellow, ending in the precipitation of a yellow crystalline species, which is readily washable and is in fact an alkaline iron oxysulfate, in this case iron sodium oxysulfate.

The analysis of this species leads to the following formula (2) $4Fe_2O_3 \cdot 6SO_3 \cdot Na_2O \cdot 7H_2O + nH_2O$ 

where $n$, generally in the 3 to 7 range, is the number of moles of crystallization water. This is a basic salt of trivalent iron, with the following structural formula:

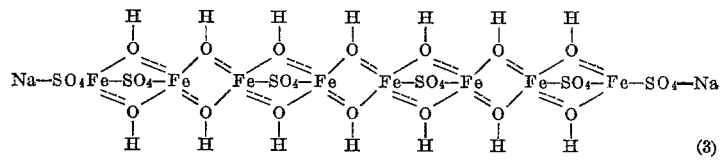

where the plain single lines correspond to valency bonds and the plain lines associated with dotted lines are coordination bonds. The crystallization water is not represented in the above structural Formula 3.

It can be seen that the sodium cations of this iron sodium oxysulfate are connected to the molecule by valency bonds so that neither extensive washing nor acidification can eliminate them.

The following reaction (4) represents the reaction yielding iron sodium oxysulfate by the sole action of sodium chlorate brought to boiling point in accordance with the invention, without any further addition of alkali cations, disregarding however the acidity of the medium and the crystallization water in the precipitate (4) $12FeSO_4 + 2NaClO_3 + 8H_2O$
    $= 4Fe_2O_3 \cdot 6SO_3 \cdot Na_2O \cdot 7H_2O$ 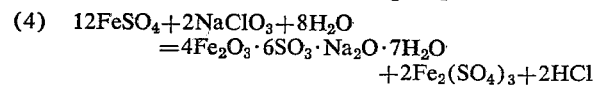
    $+ 2Fe_2(SO_4)_3 + 2HCl$ This last equation shows that one mole of sodium chlorate is used, as in Equation 1, to oxidize 6 iron atoms from the ferrous to the ferric state. On the other hand the precipitate of iron sodium oxysulfate here contains ⅔ of the total initial amount of iron whereas the precipitate of ferric hydroxide obtained from reaction (1) contained only ⅓. Correlatively the ferric sulfate remaining in solution corresponds only to one third of the total initial amount of iron, instead of ⅔ as in the case of reaction (1). Consequently, the efficiency of the reaction (4) for the manganese free iron is theoretically equal to ⅔. Passing from reaction (1) to reaction (4), the efficiency in manganese free iron has thus risen from ⅓ to ⅔, this result being due to the boiling operation according to the invention.

Experiment confirms these theoretical views, since the use of one mole of sodium chlorate for six moles of ferrous sulfate permits the easy attainment of 65% efficiency in iron in the form of a precipitate of iron sodium oxysulfate.

According to another feature of the invention, it has already been seen that alkaline cations could be partially supplied by the addition of an alkali solution such as a solution of alkali hydroxide and/or carbonate while remaining in an acid medium on the whole.

According to a preferred embodiment of the invention, the proportion of one chlorine and 3 or 4 alkali cations (including the cation supplied by the chlorate) may be used for 6 iron cations, and the solution is heated up to the boiling point.

This embodiment is illustrated hereunder in an example wherein sodium chlorate is used as oxidizing agent.

According to this embodiment an efficiency in iron of nearly 100% can be obtained, this yield being three times greater than that given by the known method already mentioned (for the same amount of alkali chlorate), the alkali iron oxysulfate thus obtained being also practically manganese free.

This increase of efficiency is obtained without any detrimental consequence on the purity of the ferric oxide, provided, of course, that the quantity of added alkali cations is well controlled and that the final washing is carefully made. Considering the reactions (1) and (4) it can be seen that the increase of efficiency occurring when iron passes through the state of alkali iron oxysulfate is essentially due to the fact that the metal of the alkali chloride appearing in the products of reaction (1) is used in reaction (4) according to the invention in order to precipitate substantially one half of the ferric sulfate appearing in the reaction (1).

Such a precipitation of ferric sulfate could be practically complete provided that a further amount of alkali cations is added, this being the amount just necessary to precipitate as alkali iron oxysulfate the ferric sulfate remaining after reaction (4).

Experiment has shown that the addition of about 2 further alkaline cations for 6 iron atoms initially provided by the ferrous sulfate is sufficient to have a total efficiency in iron exceeding 95% even reaching 98% so that the mother liquors finally contain only 2 to 5% of iron in the state of ferric sulfate. Such a solution is no longer corrosive and the use of special pipes is no longer necessary and no particular treatments have to be effected on the mother liquors before ultimate draining them off.

On the other hand, the addition of alkali cations must be such that the initial acidity of the ferrous sulfate solution which is to be oxidized by the oxidizing agent in an acid medium is not affected by this addition of alkali cations. In other words, the alkali cations should only react with the products of reaction (4). This result is obtained by the use of three alkali cations for 6 iron atoms, i.e., by an addition of two alkali cations (not coming from the oxidizing agent) for 6 iron atoms when alkali chlorate is used as oxidizer.

It has been established that, even in the case of further additions of alkali cations, the manganese initially present in the ferrous sulfate is practically missing in the ferric oxide obtained from iron sodium oxysulfate; to be more precise let us say, for instance, that the maximum amount of manganese left in 100 g. of iron is only about a few milligrams; when the washing of the alkali iron oxysulfate is very carefully made, only traces of manganese can be found in the ferric oxide.

In the preferred embodiment above mentioned, the extreme proportions of alkali cations correspond to the two following reactions, in the case of sodium as alkali cation:

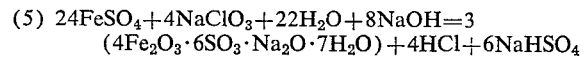

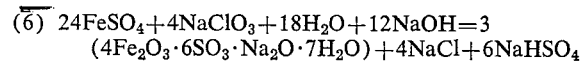

These reactions do not take into account either the initial acidity of the ferrous sulfate solution, or the crystallization water of the alkali iron oxysulfate.

In the case of reaction (5) the initial acidity is increased particularly by the formation of hydrochloric acid; in the case of reaction (6) the acidity is not affected since there is no formation of free hydrochloric acid as in the case of reaction (5) but a neutral salt, sodium chloride, is formed.

It can be noted that in the case of reaction (6) one alkali chlorate mole and 4 alkali cations (one of which comes from the said alkali chlorate) are used for six iron atoms.

Instead of sodium chlorate, potassium chlorate can be used although it is a little less soluble. In such a case, iron potassium oxysulfate is formed, its formula being:

(7) 

The method for producing a very porous and pure ferric oxide according to this invention is notably remarkable in that it consists in heating the said derived alkali oxysulfate in an oxidizing atmosphere. Preferably, the heating is effected at a temperature comprised between 875° and 925° C. In the case of iron sodium oxysulfate, the heating is advantageously effected at approximately 900° C.

Of course, such a treatment must be made on alkali iron oxysulfate from Formulae 4, 5 or 6 which has previously been thoroughly washed and dried. This heating operation is very easy to perform because the iron oxysulfate precipitate obtained by the described oxidation of a ferrous sulfate solution is of a well crystallized type; the washing of this precipitate of alkali iron oxysulfate can be made by merely decanting, which is not possible when the amorphous type of ferric hydroxide is obtained by reaction (1).

In any case, the ferric oxide obtained from such heating of the alkali iron oxysulfate as described hereinabove contains only traces of manganese.

It must also be noted that the ferric oxide thus obtained from alkali iron oxysulfate has a higher internal porosity than that of the ferric oxide obtained by heating ferric hydroxide of the amorphous type derived from Formula 1 since there is a loss of ($1.5SO_3 + 1.75H_2O + 0.5Na_2O$) per $Fe_2O_3$ mole in the first case and a loss of $3H_2O$ in the second case.

This ferric oxide derived from alkali iron oxysulfate can then be treated in several ways; either reduced to magnetite by partial reduction between 500° and 600° C. in a reducing atmosphere, or reduced to metal iron between 550° and 700° C. in a hydrogen atmosphere.

The figure of the drawing illustrates results from an embodiment of the invention. In this figure, abscissae are time in minutes, ordinates at the left are weight in kilograms of iron for curve A and at the right total efficiency of iron for curve B. In deriving the data for curves A and B, a ferrous sulfate solution was treated in accord with the invention. Thus, this solution was initially oxidized by a sodium chlorate solution (one chlorate mole for six iron atoms heated to the boiling point in accord with Equation 4).

After 60 minutes, the solution at the boiling point still contained 25 kg. of iron coresponding to an efficiency of 65%. Then, to supply additional alkali cations, a sodium carbonate solution was added for an hour and then the mix was further heated to the boiling point for approximately one additional hour.

At the end of this treatment, the residual mother liquor contained only about 1 kg. of iron (curve A) so that the efficiency of the operation slightly exceeded 98% (curve B). The iron sodium oxysulfate precipitate resulting from this procedure was then carefully washed. Its analysis showed that it contained only a few milligrams of manganese for 100 g. of iron.

The resulting precipitate is, therefore, remarkably pure and obtained with an overall efficiency in iron not far from 100%.

As embloyed herein the term "alkali cation" contemplates alkali metal cations especially potassium and sodium cations.

What is claimed is:

1. Process of producing highly porous ferric oxide of great purity and substantially free of manganese comprising the steps of reacting a manganese containing ferrous sulfate solution with an energetic oxidizing agent, selected from the group consisting of sodium chlorate and potassium chlorate, and in the presence of alkali metal cations selected from the group consisting of sodium and potassium, and which are supplied in the proportion of 3 to 4 alkali metal cations for six iron cations supplied by an additional alkali metal solution, heating the reaction to the boiling point to precipitate iron alkali metal oxysulfate while the reaction as a whole remains in acid condition, thereafter washing and drying the precipitate, and subsequently heating the washed and dried precipitate at an elevated temperature ranging from 875° to 925° C. in an oxidizing atmosphere to yield said ferric oxide.

2. Process according to claim 1 wherein one of said alkali metal cations only is supplied by said oxidizing agent and the remaining 2 to 3 alkali metal cations are supplied by an additional alkali solution selected from the group consisting of alkali metal hydroxides and alkali metal carbonates.

3. Process for the production of highly porous ferric oxide of great purity and substantially free of manganese from manganese impurity containing ferrous sulfate, comprising the steps of oxidizing a manganese containing ferrous sulfate solution by an energetic oxidizing agent in an acid medium, said agent being selected from the group consisting of sodium chlorate and potassium chlorate, said oxidation being effected and carried to completion by the addition of alkali metal ions selected from the group consisting of sodium and potassium ions in solution accompanied by boiling to produce a precipitate of iron alkali metal oxysulfate, said alkali metal ions added being in the proportion of 3-4 alkali metal cations for six cations of iron and wherein one of the alkali metal cations is supplied by said oxidizing agent and the other 2-3 alkali metal cations are supplied by the addition of said alkali metal ions in solution, and thereafter heating the precipitate at high temperature ranging from 875°–925° C. in an oxidizing atmosphere to yield said highly porous ferric oxide.

4. Process according to claim 3 wherein said solution which supplies the 2–3 alkali metal ions is an alkali metal hydroxide.

5. Process according to claim 3 wherein said solution which supplies the 2–3 alkali metal ions is an alkali metal carbonate.

6. Process according to claim 3, including the additional step of effecting partial reduction in hydrogen of the ferric oxide at an elevated temperature from 500°–600° C. to produce magnetite.

7. Process according to claim 3, including the additional step of effecting reduction of the ferric oxide at an elevated temperature of 550°–700° C. in a hydrogen atmosphere to produce iron.

References Cited

UNITED STATES PATENTS

| | | | |
|---|---|---|---|
| 2,767,076 | 10/1956 | Taylor | 75—34 |
| 2,773,743 | 12/1956 | Fackert | 23—200 |
| 2,866,686 | 12/1958 | Bennetch | 23—200 |
| 3,036,889 | 5/1962 | Frey | 23—200 |
| 3,434,947 | 3/1969 | Steintveit | 75—108 X |

FOREIGN PATENTS 1,072,744  3/1954  France.

L. DEWAYNE RUTLEDGE, Primary Examiner

G. T. OZAKI, Assistant Examiner

U.S. Cl. X.R.

23—126, 200; 75—121